United States Patent
Byrne et al.

(10) Patent No.: US 10,120,057 B1
(45) Date of Patent: *Nov. 6, 2018

(54) SYSTEM AND METHOD FOR DETERMINING THE DIRECTION OF AN ACTOR

(71) Applicant: Google LLC, Mountain View, CA (US)

(72) Inventors: Paul Vincent Byrne, Los Altos Hills, CA (US); Greg Joseph Klein, Cupertino, CA (US)

(73) Assignee: Google LLC, Mountain View, CA (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/881,822

(22) Filed: Oct. 13, 2015

(51) Int. Cl.
*G06K 9/00* (2006.01)
*G01S 3/14* (2006.01)
*G01S 3/78* (2006.01)

(52) U.S. Cl.
CPC . *G01S 3/14* (2013.01); *G01S 3/78* (2013.01)

(58) Field of Classification Search
CPC ... G06T 1/0014; G06T 7/0042; G06T 7/0051; G06T 7/0065; G06T 7/0071; G06T 7/2033; G06T 7/593; G06T 7/73; G06T 11/00; G06T 11/60; G06T 13/00–13/20; G06T 13/40–13/80; G06T 15/00; G06T 15/04; G06T 15/10–15/205; G06T 17/00; G06T 17/10; G06T 17/20–17/30; G06T 19/00; G06T 2200/04; G06T 2200/08;
(Continued)

(56) References Cited

U.S. PATENT DOCUMENTS 7,831,087 B2 * 11/2010 Harville ............ G06K 9/00201
382/103
8,577,126 B2   11/2013 Jones et al.
(Continued)

FOREIGN PATENT DOCUMENTS

WO   2015040503 A1   3/2015

OTHER PUBLICATIONS

Musleh et al., "Identifying and Tracking Pedestrians Based on Sensor Fusion and Motion Stability Predictions", Sensors, pp. 8030-8031, Aug. 27, 2010.
(Continued)

*Primary Examiner* — Jose Couso
(74) *Attorney, Agent, or Firm* — McDonnell Boehnen Hulbert & Berghoff LLP

(57) ABSTRACT

Example systems and methods are disclosed for determining the direction of an actor based on sensors within an environment. The method may include receiving point cloud data representative of the actor within the environment. The method may also include generating data segments of the point cloud data corresponding to respective height levels of the actor. The method may further include determining an area value for each data segment. Also, the method may include determining a transition between a first data segment and an adjacent second data segment based on a difference between the corresponding area values. Further, the method may include determining that the first data segment is representative of a head of the actor while the second data segment is representative of a body of the actor. The method may also include providing information indicating a direction of the actor based on the second data segment.

18 Claims, 9 Drawing Sheets

(58) Field of Classification Search
CPC ............. G06T 2200/24; G06T 2200/28; G06T 2200/32; G06T 2207/10016; G06T 2207/30196; G06T 2207/30231; G06T 2207/30232; G06T 2215/06; H04N 7/18–7/185; H04N 13/00; H04N 13/0239–13/025; H04N 13/026; H04N 13/0271–13/0275; H04N 21/441; H04N 21/44218; G06K 9/00201; G06K 9/00214; G06K 9/00248; G06K 9/00255; G06K 9/00268; G06K 9/00281; G06K 9/00288; G06K 9/00302; G06K 9/00308; G06K 9/00315; G06K 9/00335; G06K 9/00342; G06K 9/00348; G06K 9/00362; G06K 9/00369; G06K 2009/00738; G06F 17/30817; Y10S 901/01; Y10S 901/46; Y10S 901/47; B25J 9/1676; B25J 9/1689; B25J 9/1694; B25J 9/1697; G01B 11/026; G01S 7/4802; G01S 17/89
See application file for complete search history.

(56) References Cited

U.S. PATENT DOCUMENTS

| | | | |
|---|---|---|---|
| 8,971,635 | B2 | 3/2015 | Kodaira et al. |
| 8,994,790 | B2* | 3/2015 | Ganapathi .......... G06K 9/00342 348/46 |
| 9,079,311 | B2 | 7/2015 | Wang et al. |
| 9,098,738 | B2 | 8/2015 | Bilet et al. |
| 9,691,153 | B1* | 6/2017 | Byrne ................... G06T 7/0042 |
| 2002/0118274 | A1* | 8/2002 | Yahashi .................... G01S 3/14 348/46 |
| 2004/0153671 | A1 | 8/2004 | Schuyler et al. |
| 2010/0111370 | A1* | 5/2010 | Black ................. G06K 9/00369 382/111 |
| 2012/0075464 | A1 | 3/2012 | Derenne et al. |
| 2013/0148853 | A1 | 6/2013 | Hwang et al. |
| 2013/0181892 | A1 | 7/2013 | Liimatainen et al. |
| 2013/0182905 | A1 | 7/2013 | Myers et al. |
| 2013/0190086 | A1* | 7/2013 | Maison .............. G06K 9/00369 463/31 |
| 2013/0286012 | A1* | 10/2013 | Medioni ................. G06T 17/00 345/420 |
| 2013/0289449 | A1 | 10/2013 | Stone et al. |
| 2014/0049769 | A1 | 2/2014 | Zheleznyak |
| 2015/0088310 | A1 | 3/2015 | Pinter et al. |
| 2016/0117859 | A1* | 4/2016 | Perbet ..................... G06T 17/20 345/423 |
| 2016/0253807 | A1* | 9/2016 | Jones ................... G06T 7/0046 382/154 |
| 2017/0263002 | A1* | 9/2017 | Byrne ....................... G06T 7/20 |

OTHER PUBLICATIONS

Takeuchi, "Design of a 3D Interface Using a Markerless Paper in Augmented Reality Environments", University of Tokyo, p. 29, 2013.

* cited by examiner

SYSTEM AND METHOD FOR DETERMINING THE DIRECTION OF AN ACTOR

BACKGROUND

Physical spaces may be used for retail, manufacturing, assembly, distribution, office space, and/or other purposes. The design and operation of these physical spaces is becoming more intelligent, more efficient, and more intuitive. As technology becomes increasingly prevalent in modern life, using technology to enhance physical spaces becomes more apparent. Thus, a demand for enhanced physical spaces has increased innovation in sensing techniques, data processing, software, and user interface design.

SUMMARY

Example systems and methods may provide for determining a direction of an actor based on sensors within an environment. The environment may include sensors, such as LIDAR sensors, that receive point cloud data representative of an actor. The point cloud data may be analyzed to determine a body of the actor. Once the body of the actor is determined, the system may determine a direction of the body. A direction of the actor may be inferred based on the direction of the body.

The system may begin analyzing the point cloud data to determine the body of the actor by generating a plurality of data segments of the point cloud data. Area values may then be calculated for each generated data segment. The area values of the data segments may be compared to determine a transition between a first data segment and an adjacent second data segment. After finding the transition, the first data segment may be determined to be representative of the head of the actor, while the second data segment may be determined to be representative of the body of the actor. A bounding box may then be generated around the second data segment to determine the direction of the body of the actor.

In one example, a method is provided that includes receiving point cloud data for an actor including a plurality of points that are representative of the actor within an environment. The method may also include generating a plurality of data segments of the point cloud data corresponding to respective height levels for the actor, wherein each data segment includes a portion of the plurality of points. The method may additionally include determining an area value for each data segment. The method may also include determining a transition from a first data segment to an adjacent second data segment based on a difference between the area value for the first data segment and the area value for the second data segment. The method may further include determining based on the transition that the first data segment is representative of a head of the actor and that the second data segment is representative of a body of the actor. The method may also include providing information indicating a direction of the actor based at least on the determined second data segment representative of the body of the actor.

In an additional example, a non-transitory computer readable medium is provided that stores instructions that are executable by one or more computing devices. When the instructions are executed, the instructions cause the one or more computing devices to perform functions that include receiving point cloud data for an actor including a plurality of points that are representative of the actor within an environment. The functions may also include generating a plurality of data segments of the point cloud data corresponding to respective height levels for the actor, wherein each data segment includes a portion of the plurality of points. The functions may also include determining an area value for each data segment. The functions may also include determining a transition from a first data segment to an adjacent second data segment based on a difference between the area value for the first data segment and the area value for the second data segment. The functions may further include determining based on the transition that the first data segment is representative of a head of the actor and that the second data segment is representative of a body of the actor. The functions may also include providing information indicating a direction of the actor based at least on the determined second data segment representative of the body of the actor.

In another example, a robotic device is disclosed that includes a processor and a memory that stores instructions that are executed by the processor. When executed, the instructions cause the robotic device to perform functions that include receiving point cloud data for an actor including a plurality of points that are representative of the actor within an environment. The functions may also include generating a plurality of data segments of the point cloud data corresponding to respective height levels for the actor, wherein each data segment includes a portion of the plurality of points. The functions may also include determining an area value for each data segment. The functions may also include determining a transition from a first data segment to an adjacent second data segment based on a difference between the area value for the first data segment and the area value for the second data segment. The functions may further include determining based on the transition that the first data segment is representative of a head of the actor and that the second data segment is representative of a body of the actor. The functions may also include determining a direction of the actor based at least on the determined second data segment representative of the body of the actor. The functions may further include adjusting operation of the robotic device based on the direction of the actor.

In a further example, a system may include means for receiving point cloud data for an actor including a plurality of points that are representative of the actor within an environment. The system may also include means for generating a plurality of data segments of the point cloud data corresponding to respective height levels for the actor, wherein each data segment includes a portion of the plurality of points. The system may additionally include means for determining an area value for each data segment. The system may also include means for determining a transition from a first data segment to an adjacent second data segment based on a difference between the area value for the first data segment and the area value for the second data segment. The system may further include means for determining based on the transition that the first data segment is representative of a head of the actor and that the second data segment is representative of a body of the actor. The system may also include means for providing information indicating a direction of the actor based at least on the determined second data segment representative of the body of the actor.

The foregoing summary is illustrative only and is not intended to be in any way limiting. In addition to the illustrative aspects, embodiments, and features described above, further aspects, embodiments, and features will

DETAILED DESCRIPTION

Figure 1:
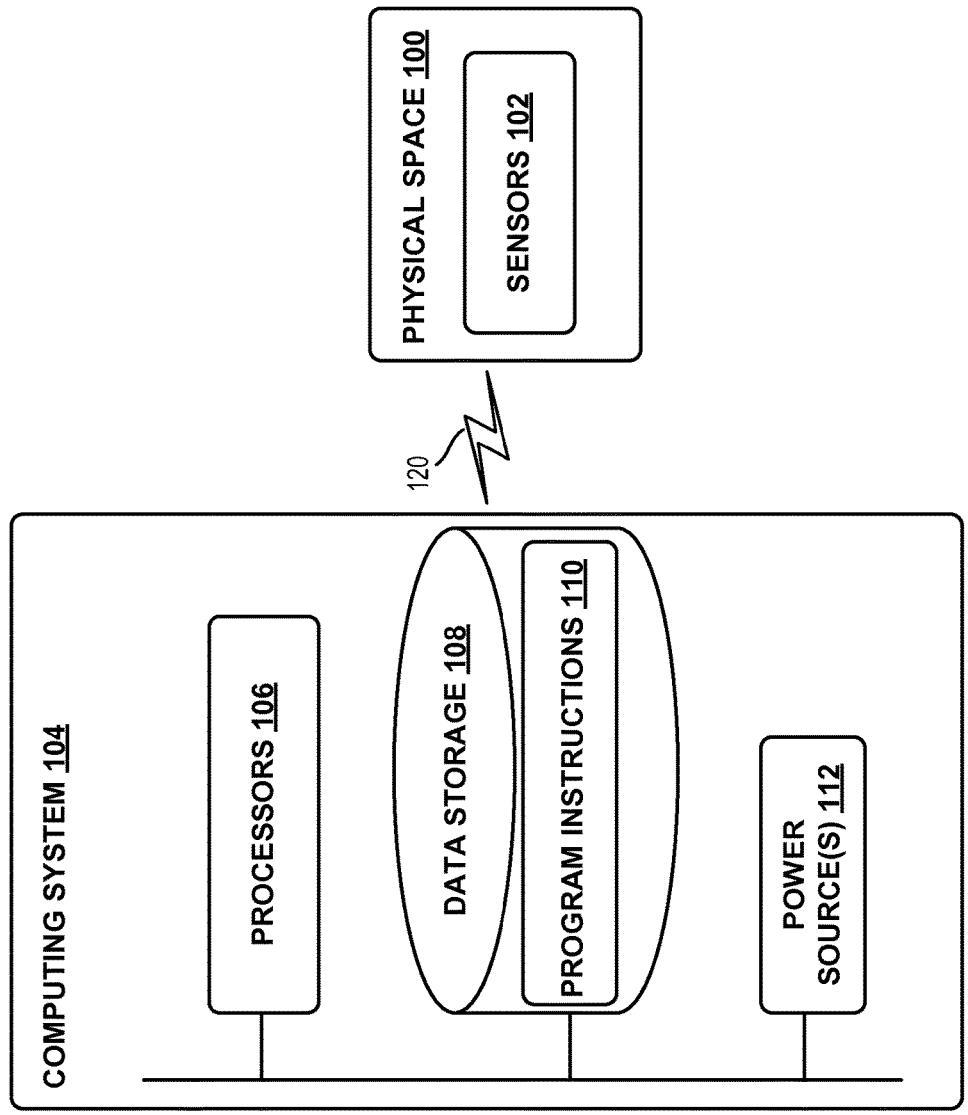
FIG. 1 illustrates a configuration of a system for determining a direction of an actor based on sensors in an environment, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

For a system that detects actors (such as people, robots, etc.) within a space (such as a 20 meter by 20 meter room), it may be useful to determine additional information about one or more actors within the space. For example, identifying a direction that a particular actor in the space is oriented may be useful. For another example, it may also be useful for the system to determine which way the actor is pointing with his arm. Determining this information, however, may be challenging for at least three reasons.

First, the system may detect people within the space using acquired sensor data (such as sensor data from LIDAR sensors) that provides limited information about the actor. Second, the collected sensor data may be sparse: there may not be many data points collected by the system. Third, the density of the acquired data points may be non-uniform. For example, some areas may have high point density while other areas have low point density. For these reasons, it may be challenging to determine information about actors detected within the space.

To overcome this challenge, a method may be executed to detect actors and determine the direction that a detected actor is oriented or pointing. The method may begin by obtaining point cloud data representing actors within a space from the LIDAR sensors within the space. Next, method may include determining that a portion of the data represents a particular actor. After this step, the portion of data representing an actor may be segmented vertically into multiple data segments. Following this step, the area of each data segment may be calculated. The data segments may then be scanned from top to bottom to determine a transition between the head and the torso and/or the body of an actor based on the calculated areas. Next, a bounding box may be generated around the data segment representing the torso to determine the direction the torso is oriented. This direction can then be inferred to be the direction the actor is oriented.

The system can execute this method to determine the direction that an actor is oriented. The system may use the direction of the actor, for example, to determine a quadrant of a screen that the actor is looking at. Point cloud data indicating a location of the arm of the actor may also be received by the system. The system may determine a direction that the user is pointing in with his arm. The system may use this information, for example, to determine a quadrant of the screen that the user is pointing to.

One or more LIDAR sensors may be used by the system to acquire point cloud data about the one or more actors within the space. The system may rely on different types of sensors instead of, or in addition to, LIDAR sensors. The point cloud data may include a plurality of points, each of which represents a point on a surface of the detected actor. The point cloud data acquired may be sparse, in some embodiments. The point cloud data may also have a non-uniform density. Thus, the system and method to determine orientation information about a detected actor may accommodate acquired sensor data that is sparse and has a non-uniform density.

After acquiring point cloud data for an actor, the system may identify the torso of the actor based on one or more data segments generated from the point cloud data. The system may use vertical segmentation to generate the data segments, with each representing a portion of the actor. The system may calculate an area value for each data segment. The area values may then be analyzed to find the data segment representing the torso.

In one embodiment, a first torso data segment is identified by scanning the data segments from the top to the bottom and identifying a large change in area representing the transition from the head to the torso. In other embodiments, the first torso data segment is represented by the data segment with the largest area, and thus can be identified by selecting the data segment with the largest area value. Other methods may be possible for identifying the torso, or other portions of the actor.

The system may determine the direction an actor is oriented based on the first torso data segment. In one embodiment, the system generates a bounding box around the first torso data segment. Using the bounding box, the system determines the direction the torso of the actor is oriented. Based on this determined direction, it can then be inferred that the actor is oriented in the same direction.

The system may also determine a direction an actor is pointing as well. In this case, the system identifies a data segment representing an arm of an actor using vertical segmentation. Once the arm is identified, the system may create a bounding box around the arm. Based on the bounding box, the system may then determine where the actor is pointing. Other methods may also be possible for the system to determine where the actor is pointing.

The method executed by the system to determine additional information about detected actors can accommodate blind spots. Blind spots can occur when the LIDAR sensors are unable to sense data and/or detect people in a particular location in a space. Blind spots can occur because there may not be enough LIDAR sensors to detect people throughout the entire space. Alternatively, blind spots may occur because of an obstacle or an occlusion in the space. Other reasons may exist for blind spots. Despite the LIDAR sensor-based system being prone to blind spots, sparse data, and non-uniform data density, the method relying on generating a bounding box around an actor's torso can overcome these obstacles to determine information about the detected actor.

The system may also overcome the challenges of sparse data with a non-uniform density and blind spots by making inferences based on the acquired data. The system may rely on historical velocity data indicating one or more previous velocity values of an actor in the space. For example, the historical velocity values may indicate a speed at and a direction in which the actor was walking or moving. Additionally, historical orientation data may be used to indicate a direction that the actor was oriented. Based on historical velocity and orientation data, the system may infer a direction that an actor is oriented at a particular time.

The system may also be designed to reduce the number of inferences made regarding additional information for people. For example, blind spots can be reduced by adding more sensors, such as LIDAR sensors. By adding more sensors to reduce blind spots, fewer inferences may then be needed by the system. Sensors may be added when acquired data is too sparse for the method to effectively determine information regarding detected actors.

FIG. 1 shows an example physical space 100 having one or more sensors 102. A physical space may define a portion of an environment in which people, objects, and/or machines may be located. The physical space may take on a two-dimensional or a three-dimensional form and may be used for various purposes. For instance, the physical space may be used as a retail space where the sale of goods and/or services is carried out between individuals (or businesses) and consumers. While various aspects of the disclosure are discussed below in the context of a general space, example implementations are not limited to general spaces and may extend to a variety of other physical spaces such as retail spaces, manufacturing facilities, distribution facilities, office spaces, shopping centers, festival grounds, and/or airports, among other examples. Although only one physical space 100 is shown in FIG. 1, example implementations may be carried out in the context of a plurality of physical spaces.

Example sensors in a physical space (e.g., one or more sensors 102) may include but are not limited to: force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

Additionally, the sensors may be positioned within or in the vicinity of the physical space, among other possible locations. Further, an example implementation may also use sensors incorporated within existing devices such as mobile phones, laptops, and/or tablets. These devices may be in the possession of people located in the physical space such as consumers and/or employees within a retail space. Additionally or alternatively, these devices may be items on display, such as in a retail space used for selling consumer electronics. Yet further, each physical space 100 may include the same combination of sensors or different combinations of sensors.

FIG. 1 also depicts a computing system 104 that may receive data from the sensors 102 positioned in the physical space 100. In particular, the sensors 102 may provide sensor data to the computing system by way of communication link 120. Communication link 120 may include one or more wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "Wi-Fi" connectivity using 802.11).

In other examples, the arrangement may include access points through which one or more sensors 102 and/or computing system 104 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity by way of the cellular network. Other examples are also possible.

Computing system 104 is shown to include one or more processors 106, data storage 108, program instructions 110, and power source(s) 112. Note that the computing system 104 is shown for illustration purposes only as computing system 104, but may include additional components and/or have one or more components removed without departing from the scope of the disclosure. Further, note that the various components of computing system 104 may be arranged and connected in any manner.

Each processor, from the one or more processors 106, may be a general-purpose processor or a special purpose processor (e.g., digital signal processors, application specific integrated circuits, etc.). The processors 106 can be configured to execute computer-readable program instructions 110 that are stored in the data storage 108 and are executable to provide the functionality of the computing system 104 described herein. For instance, the program instructions 110 may be executable to provide for processing of sensor data received from one or more sensors 102.

The data storage 108 may include or take the form of one or more computer-readable storage media that can be read or accessed by the one or more processors 106. The one or more computer-readable storage media can include volatile and/or non-volatile storage components, such as optical, magnetic, organic or other memory or disc storage, which can be integrated in whole or in part with the one or more processors 106. In some implementations, the data storage 108 can be implemented using a single physical device (e.g., one optical, magnetic, organic or other memory or disc storage unit), while in other implementations, the data storage 108 can be implemented using two or more physical devices. Further, in addition to the computer-readable program instructions 110, the data storage 108 may include additional data such as diagnostic data, among other possibilities. Further, the computing system 104 may also include one or more power source(s) 112 configured to supply power to various components of the computing system 104. Any type of power source may be used such as, for example, a battery. In some embodiments, the computing system 104 may include more, fewer, and/or different components than those shown in FIG. 1.

Figure 2A:
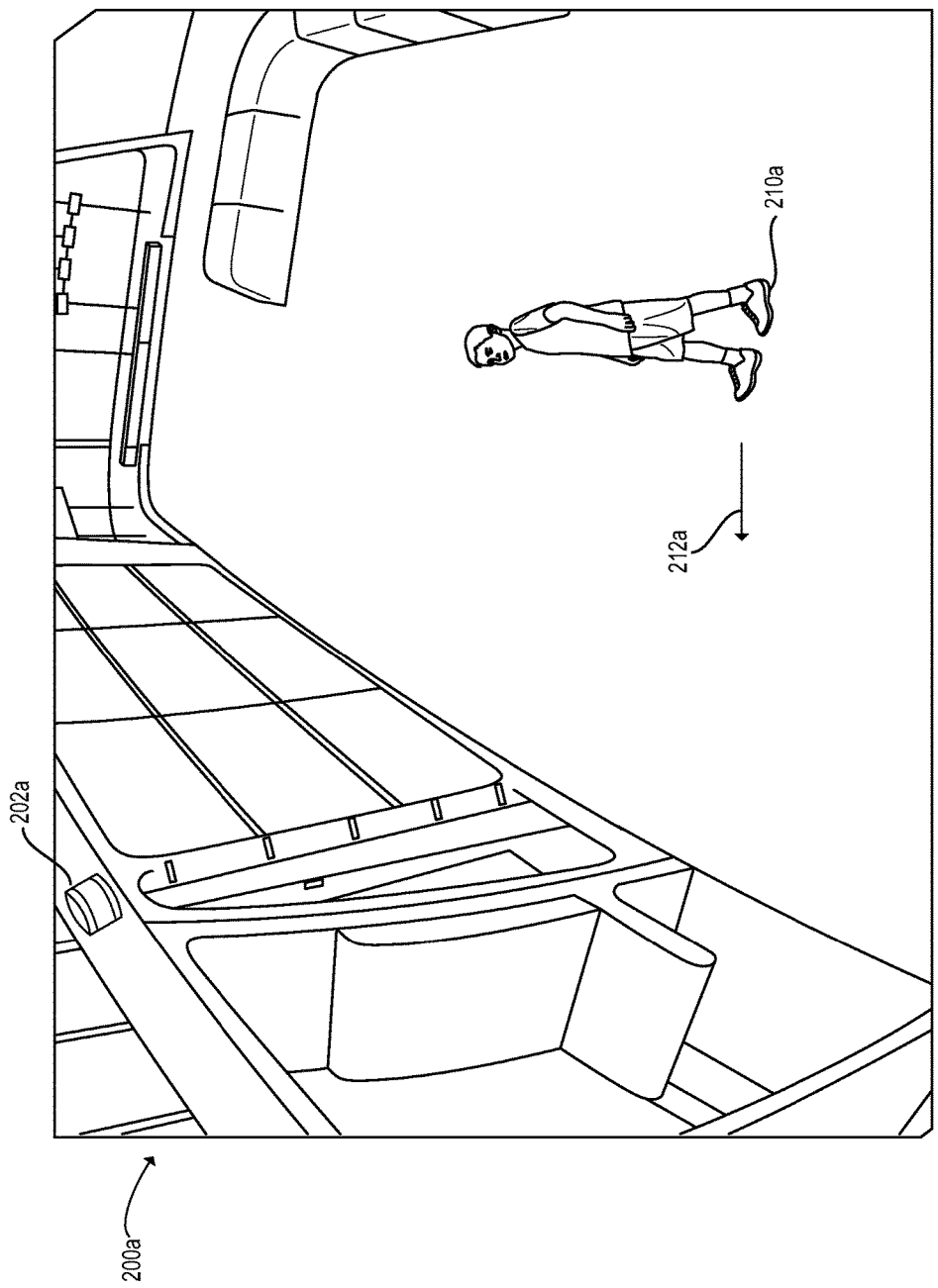
FIG. 2A illustrates an example environment with an actor, according to an example embodiment.
Figure 2B:
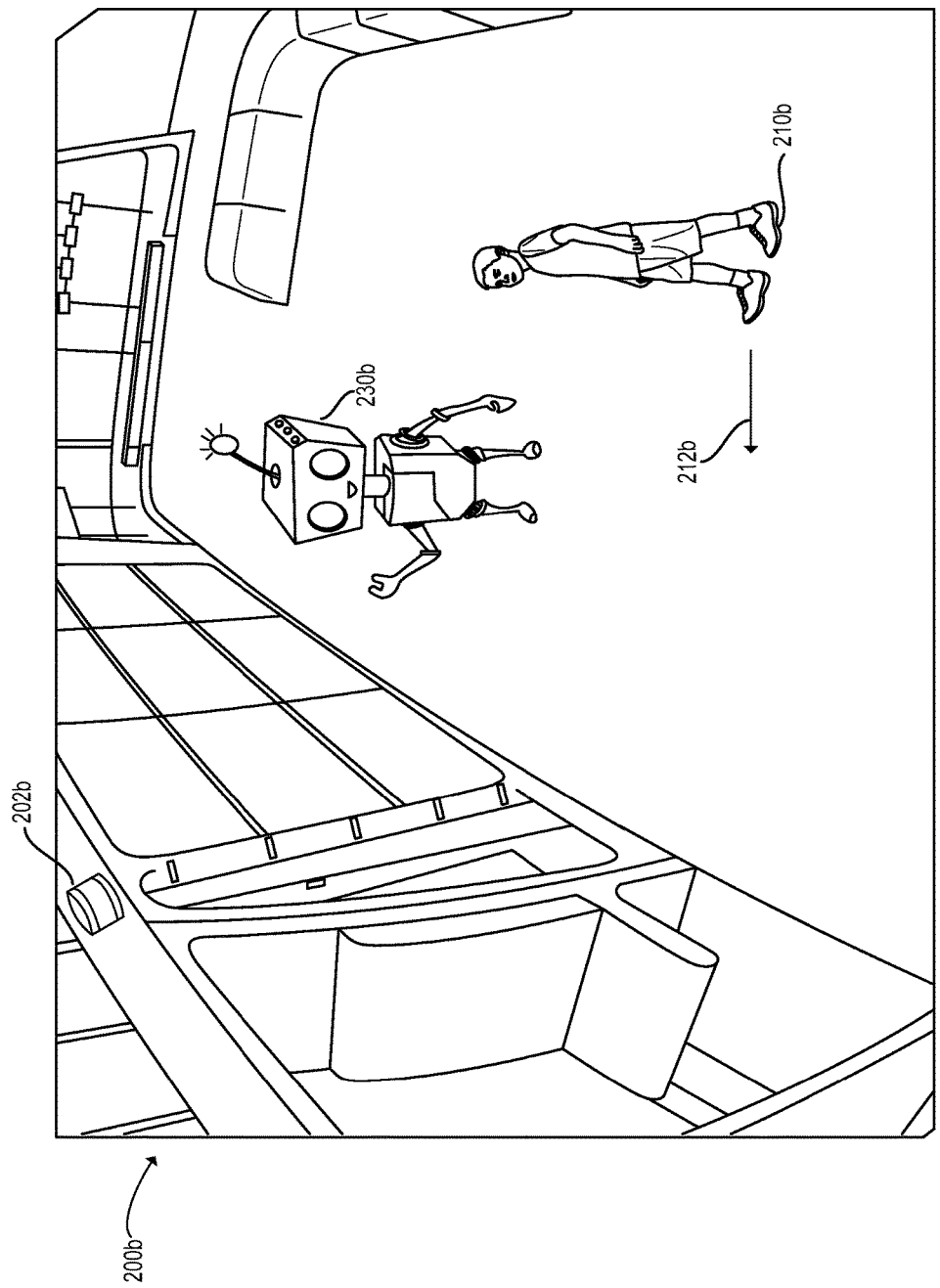
FIG. 2B illustrates another example environment with an actor and a robotic device, according to an example embodiment.

FIGS. 2A and 2B display example embodiments of an environment with one or more sensors. In FIG. 2A, the environment 200a includes a sensor 202a and an actor 210a. In FIG. 2B, the environment 200b includes a sensor 202b, an actor 210b, and a robotic device 230b. In FIG. 2A, the direction of the actor 210a is shown by vector 212a, while in FIG. 2B, the direction of the actor 210b is shown by vector 212b. In FIGS. 2A and 2B, more, fewer, and/or different objects may be included in environments 200a and/or 200b.

The environments 200a and 200b displayed in FIGS. 2A and 2B may correspond to one or more physical spaces. In the displayed embodiments, the environment corresponds to one physical space, such as physical space 100 described in FIG. 1. The physical space may be used for a variety of purposes, including retail, manufacturing, assembly, distribution, business, healthcare, and/or other purposes. In other embodiments, the environments 200a and/or 200b may include multiple physical spaces, with each physical space having one or more sensors, such as sensors 102 described in FIG. 1. For example, a home may be an environment with multiple rooms (bedroom, kitchen, bathroom, dining room, etc.) corresponding to multiple physical spaces, with each physical space having one or more sensors. Other embodiments of environments 200a and/or 200b may also be possible.

In FIGS. 2A and 2B, the sensors 202a and 202b are LIDAR sensors used to collect point cloud data of detected objects within the environment. Although a spinning LIDAR sensor is displayed, other types of sensors, including motion capture sensors, thermal imaging sensors, other types of LIDAR sensors, or other depth sensors, may be used instead to obtain point cloud data or other types of data for detecting objects. While the displayed embodiments only show one sensor, in other embodiments, multiple sensors may be located throughout the environment. Further, the sensors may be stationary, moving, or some combination of the two while in the environment.

For example, sensor 202b may be attached to a robotic device 230b. In this case, when the robotic device 230b is stationary, the attached sensor 202b may also be stationary. However if the robotic device 230b is moving, then the attached sensor 202b would also be moving. Alternatively, the sensors may be attached to a fixed location within the environment, as shown by sensors 202a and 202b in FIGS. 2A and 2B, respectively. Sensors 202a and 202b obtain point cloud data of one or more detected actors within the environment.

In FIGS. 2A and 2B, an actor (210a and 210b, respectively) is displayed within the environment. The actor may be stationary at one location, moving from one location to another location, or a combination of both over a period of time. If the actor is stationary at one location, the actor may be sitting, standing, lying down, or stationary in some other way at a location while oriented in a particular direction. Alternatively, if the actor is moving from one location to another location, the actor may be walking, running, jumping, or moving in some other way from one location to another location along a particular direction. The actor may be a person, a robotic device, or some other object oriented in a direction or moving along a direction.

In FIGS. 2A and 2B, the displayed actor has a corresponding direction 212a and 212b, respectively. When the actor is stationary, the direction corresponds to the direction the actor is oriented. Alternatively, when the actor is moving, the direction describes the direction the actor is moving along. Directions 212a and 212b may be representative of a three-dimensional vector describing the direction that the actor is oriented or moving in FIGS. 2A and 2B. Alternatively, directions 212a and 212b may describe a two-dimensional vector describing the direction that the actor is oriented or moving in FIGS. 2A and 2B. In other embodiments, the direction 212a and/or 212b may represent a direction that the actor is pointing with his arm or some other part of the actor.

The sensors in FIGS. 2A and 2B may allow the system from FIG. 1 to collect historical data describing historical velocity and historical orientation measurements. Historical velocity data may include information describing the speed and direction that an actor was previously moving. Historical orientation data may describe previously determined directions of the actor at earlier points in time. In some embodiments, the velocity direction may be the same as the orientation of the actor, and thus the direction of the actor. However, in other embodiments, the velocity direction may be different from the orientation of the actor.

For example, if an actor is walking backwards, then the velocity direction of the actor (walking in a backwards direction) is opposite from the direction the actor is oriented (forwards). In this case, the determined direction of the actor may be the direction the actor is oriented (forwards) or the direction the actor is moving (backwards). The determined direction may be a user selectable option or configured at the system for the scenario when the velocity direction of the user can differ from the direction the actor is oriented. The historical orientation may equal the determined direction of the actor, which in this case may be forwards or backwards, depending on how the system is configured. Thus, the historical velocity direction may be the same or different from a historical orientation of an actor.

When determining the direction of an actor, the system may analyze one or more parts of the actor. In the displayed embodiments of FIGS. 2A and 2B, the actor has parts including a head, a body, a bottom of the body, one or more arms, and one or more legs. An actor may include more, fewer, and/or different parts than those described. The parts of the actor are described in more detail in FIGS. 3A-3D.

FIG. 2B displays robotic device 230b. The operation of the robotic device 230b may be adjusted based on the determined direction 212b of the actor 210b. The robotic device 230b may adjust operations including navigation of the robotic device 230b, teleconferencing between the robotic device 230b and the actor 210b, telepresence of a robotic device user with the actor 210b, or the execution of one or more tasks. Further, in response to the determined direction 212b of the actor 210b, the robotic device 230b may adjust its operation by doing nothing and/or stopping what the robotic device 230b was previously doing. Other operation adjustments by the robotic device 230b are also possible.

Although FIG. 2B displays sensor 202b as being remotely located from the robotic device 230b, in some embodiments, robotic device 230b includes one or more sensors 202b to detect actor 210b. In some embodiments, the robotic device 230b uses its own attached sensors to detect and determine the direction of the actor 210b. Alternatively, the robotic device 230b may receive communications from system 104 (see FIG. 1) indicating the direction of the actor 210b.

Alternatively, the robotic device 230*b* may receive sensor data from system 104 (see FIG. 1) and then determine the direction 212*b* of the actor 210*b*. Other methods of determining the direction of the actor 210*b* for the robotic device 230*b* are also possible.

The system 104 of FIG. 1 may provide information indicating the determined direction 212*b* to a user/operator that is controlling or assisting the robotic device 230*b*. The system 104 may rely on a communication link (such as link 120) in connection with a computing device (not shown) of the user or operator of the robotic device 230*b*. The computing device may be a computer, personal computer, laptop, phone, PDA, tablet, mobile device, wearable computing device, or some other computing device of the user or operator. Other embodiments for providing the information to the user/operator controlling or assisting the robotic device are also possible.

In some embodiments, the robotic device 230*b* may be the detected actor. In these cases, the robotic device may have characteristics similar to that of the detected actor 210*b*. For example, the robotic device 230*b* may be stationary, moving, or a combination of both over a period of time. The direction of the robotic device may be similar to the direction 212*b* of the detected actor 210*b*. In particular, the direction of the robotic device 230*b* as a detected actor may correspond to the direction the robotic device is oriented, the direction the robotic device is moving along, the direction the robotic device is pointing, or some other direction of the robotic device. Furthermore, the robotic device direction may be determined using historical velocity and/or historical orientation data. Also, the robotic device may include parts, such as a head, body, bottom of the body, one or more arms, one or more legs, and/or other components.

Figure 3A:
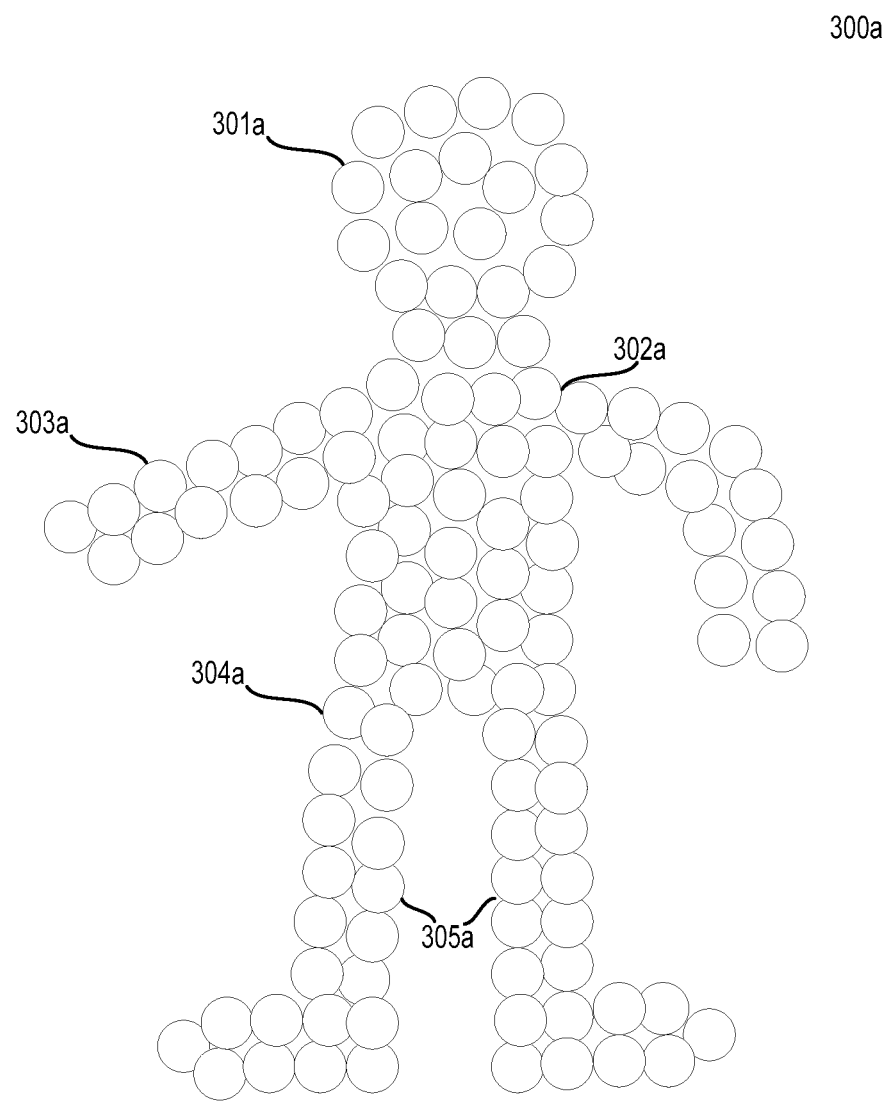
FIGS. 3A-3D illustrate an example point cloud representative of an actor, according to an example embodiment.

FIG. 3A displays point cloud data 300*a* representative of an actor. The point cloud data 300*a* includes point cloud data representative of various parts of the actor. The point cloud data 300*a* includes point cloud data 301*a*, 302*a*, 303*a*, 304*a*, and 305*a*. Point cloud data 301*a* is representative of the head of the actor. Point cloud data 302*a* is representative of the body of the actor. Point cloud data 303*a* is representative of the arm of the actor. Point cloud data 304*a* is representative of the bottom of the body of the actor, while point cloud data 305*a* is representative of the legs of the actor. In other embodiments, point cloud data 300*a* may include point cloud data for more, fewer, and/or different parts of the actor. Point cloud data 300*a*-305*a* corresponds to the point cloud data 300*b*-305*b* for FIG. 3B, the point cloud data 300*c*-305*c* for FIG. 3C, the point cloud data 300*d*-305*d* for FIG. 3D, and the point cloud data 400-405 for FIG. 4.

The point cloud data 300*a* includes a plurality of points received from one or more sensors within an environment, such as sensors 102, 202*a*, and/or 202*b* from FIGS. 1, 2A, and 2B, respectively. Each received point may represent a point on the surface of the actor. The sensor may provide a cluster of points in a particular area of the actor. The cluster of points may then be representative of a part of the actor. For example, the cluster of points identified by 301*a* may be representative of the head of the actor.

Determining information about the actor based on the received, clustered point cloud data 300*a* may be challenging for at least three reasons. First, the point cloud data received from the one or more sensors may be sparse. Thus, the point cloud data may not be as rich, as detailed, or have as many points as other sensor data for determining information about an actor.

Second, the point cloud data may have a non-uniform density. Some stripes of received point cloud data may have a high density. But other stripes of received point cloud data may have a low density. Thus, techniques for determining additional information based on the received point cloud data may accommodate point cloud data with varying density values.

Third, the received point cloud data may be prone to blind spots. Blind spots occur when a portion of the environment cannot be sensed by the one or more sensors (such as sensors 102, 202*a*, and/or 202*b* displayed in FIGS. 1, 2A, and 2B, respectively) within the environment. A blind spot may occur because a sensor is not present at a portion of the environment.

Alternatively, blind spots may occur due to obstacles and/or occlusions. For example, a blind spot may occur at a portion of the environment due to an object blocking a portion of the environment from sensing by a sensor. For another example, a blind spot may occur at a portion of the environment because another actor or robotic device is located in between the sensor and the portion of the environment. Thus, if an actor was located at a portion of the environment while the robotic device (or another actor) was located in between the sensor and the actor, the robotic device may cause the portion of the environment to become a blind spot, which would prevent the actor from being detected by the sensor. Additional sensors may be added to the environment to reduce blind spots.

Because the received point cloud data is sparse, has a non-uniform density, and is prone to blind spots, it can be challenging to determine additional information about an actor based on the received point cloud data. Thus, techniques for determining additional information about an actor (such as the direction of the actor) using the point cloud data may accommodate the characteristics and challenges of the point cloud data. One way to determine the direction of an actor is to infer the direction of the actor to be the same as the direction of the torso, or body, of the actor. Vertical segmentation of the point cloud data can help with identifying the torso of the actor, while a bounding box can help with identifying the direction of the torso of the actor.

Figure 3B:
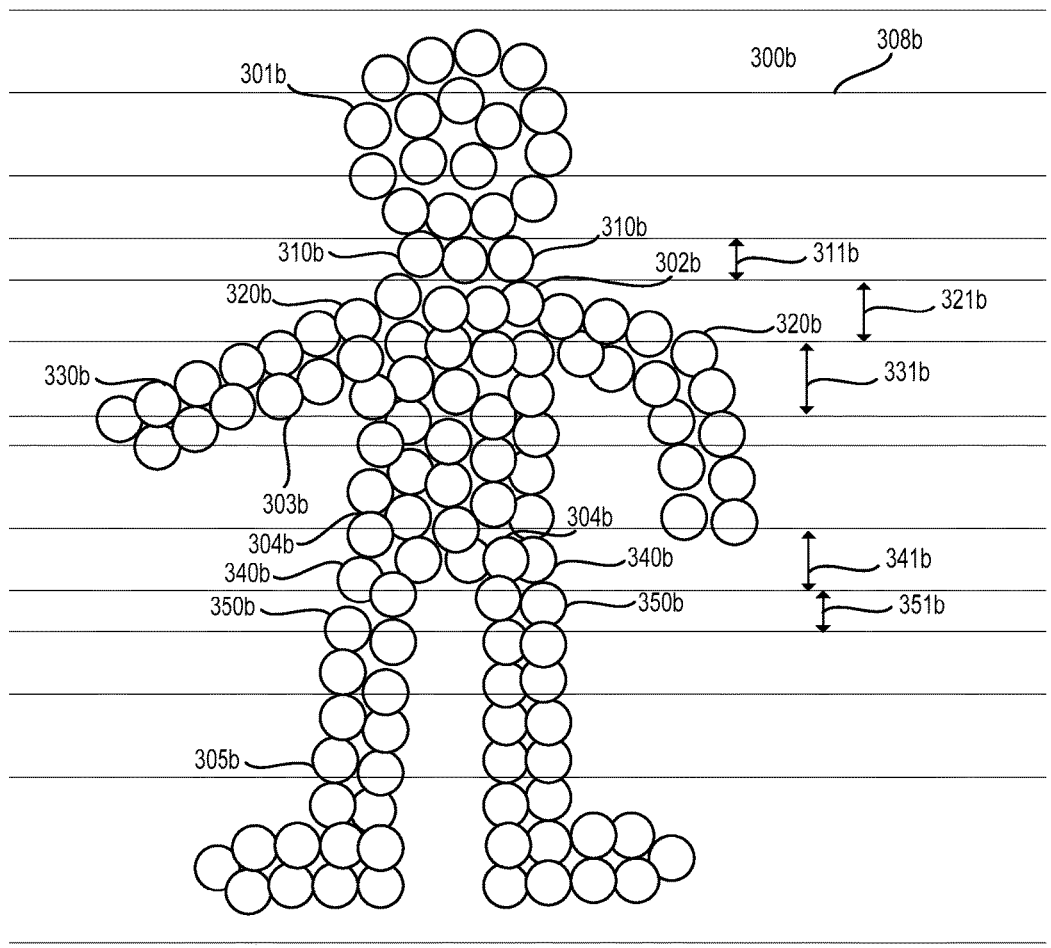

FIG. 3B displays a vertical segmentation of the point cloud data 300*b* representative of the actor. FIG. 3B displays segmentation lines 308*b*, first data segment 310*b*, second data segment 320*b*, third data segment 330*b*, fourth data segment 340*b*, and fifth data segment 350*b*. The data segments 310*b*-350*b* correspond to the data segments 310*c*-350*c* of FIG. 3C. Data segments 310*b* and 320*b* correspond to the data segments 310*d* and 320*d* of FIG. 3D. Segmentation lines 308*b* correspond to segmentation lines 308*c* and 308*d* of FIGS. 3C and 3D, respectively.

Vertical segmentation of the point cloud data 300*b* may be done with one or more segmentation lines 308*b*. Each data segment may include a portion of the points for point cloud data 300*b*. Further, each data segment may include a portion, or all, of the points corresponding to one or more of the parts of the actor, such as parts 301*b*, 302*b*, 303*b*, 304*b*, and/or 305*b*. For example, a data segment may have a portion of the points of the point cloud data 301*b* that is representative of a head. Alternatively, the data segment may include all of the points of the point cloud data 301*b* that is representative of a head, as well as additional points representative of a different part of the actor, such as the body 302*b*. Thus, a data segment may be representative of one or more parts of the actor.

Vertical segmentation of the point cloud data 300*b* may generate one or more data segments, including a first data segment 310*b*, a second data segment 320*b*, a third data segment 330*b*, a fourth data segment 340*b*, and a fifth data segment 350*b*. The first data segment 310*b* may be representative of a part of the actor above the torso or body of the actor and has a height level 311*b*.

The second data segment 320*b* may be representative of a portion, or all, of the body 302*b* of the actor and has a height level 321*b*. Additionally, the second data segment 320*b* may be adjacent to the first data segment. The third data segment 330*b* may be representative of a portion, or all, of the arm 303*b* of the actor and has a height level 331*b*. Further, the third data segment 330*b* may be adjacent to the second data segment 320*b*.

The fourth data segment 340*b* may be representative of a portion, or all, of the bottom of the body of the actor 304*b* and has a height level 341*b*. The fifth data segment 350*b* may be representative of a portion, or all, of the legs of the actor 305*b* and has a height level 351*b*. Also, the fifth data segment 350*b* may be adjacent to the fourth data segment 340*b*. In other embodiments, more, fewer, and/or different data segments may be generated during vertical segmentation of the actor.

The height levels of each data segment, in some embodiments, may be equal, while in other embodiments, the height levels of the data segments may vary. In some embodiments, data segments for parts of the actor where higher resolution is preferred may have smaller height levels. In other embodiments, data segments for parts of the actor where lower resolution is acceptable may have larger height levels. Assigning larger height levels to data segments for parts of an actor that don't require high resolution allows a system, such as system 104 from FIG. 1, to use less computing resources and operate more efficiently. Meanwhile, smaller height levels for data segments increases resolution and may be useful for detecting transitions between one part of an actor and another part of an actor, as described in FIG. 3C.

Figure 3C:
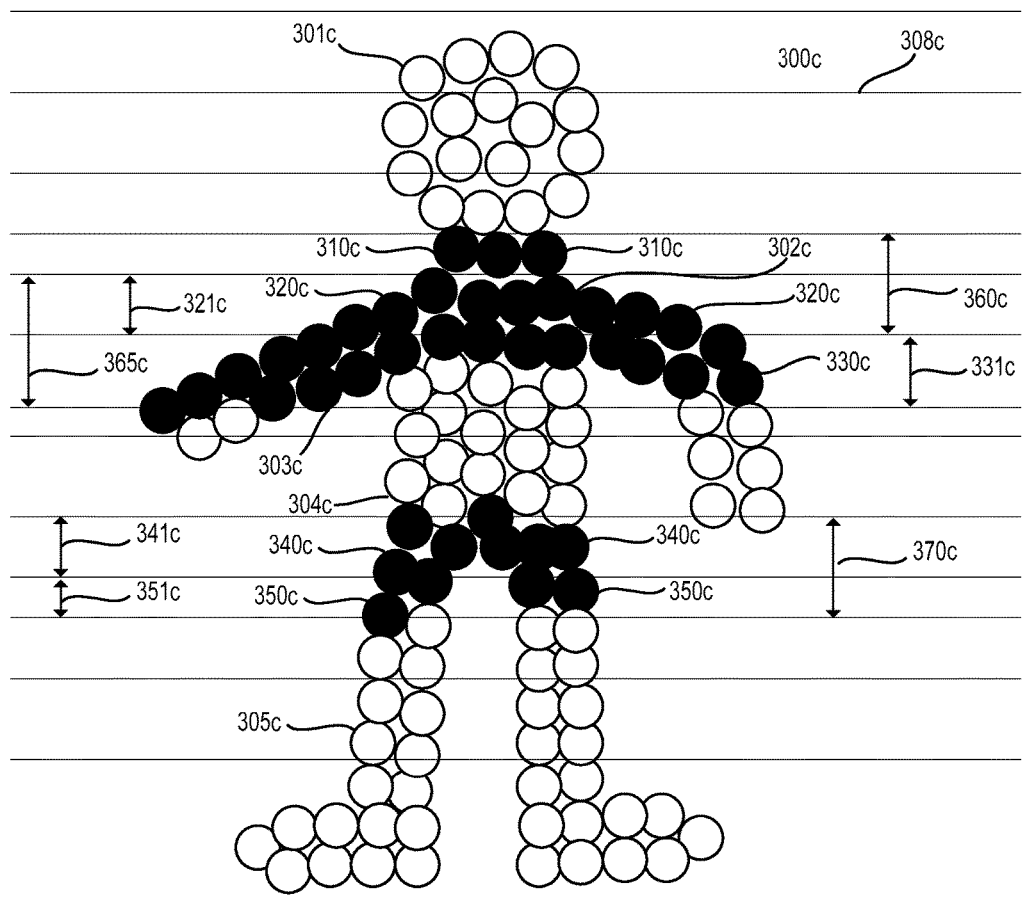

FIG. 3C displays vertical segmentation of point cloud data 300*c* for detecting transitions. FIG. 3C displays a first transition 360*c*, a second transition 365*c*, and a third transition 370*c*. The first transition 360*c*, which corresponds to transition 360*d* in FIG. 3D, may represent a transition between the head 301*c* of the actor and the body 302*c* of the actor. The second transition 365*c* may represent a transition between the body 302*c* of the actor and the arm 303*c* of the actor. The third transition 370*c* may represent a transition between the bottom of the body 304*c* of the actor and the legs 305*c* of the actor. More, fewer, and/or different transitions may be found during segmentation of point cloud data 300*c*. The system may identify transitions within the point cloud data 300*c* to identify parts of interest of the actor and determine additional information about the actor.

After segmenting the point cloud data, the system (such as system 104 from FIG. 1) may perform one or more steps to determine one or more transitions within the point cloud data. First, the system may determine an area value for each data segment generated from the segmentation of the point cloud data. Next, the system may scan the generated data segments to find one or more transitions based on the calculated area values of the data segments. During the scan, the system may compare area values of the generated data segments. After completing the scan, the system may determine one or more transitions present within the point cloud data. Once the transitions have been identified, the system may further identify the data segments of each identified transition. The identified data segments may then be further processed to determine additional information about the actor.

The system may initially calculate area values for each generated data segment to identify transitions within the point cloud data. An area value for a data segment may represent the area that is covered by the portion of the points of the point cloud data 300*b* that is included within the particular data segment. For example, in FIG. 3C, the area values calculated for segments 310*c*-350*c* may represent the area spanned by the shaded point cloud data for each of the data segments 310*c*-350*c*. The area value may refer to the area of the points in a two-dimensional shape, such as a rectangle, an ellipse, or some other data segment shape. Alternatively, the area value could be a surface area spanned by the point cloud data corresponding to a three-dimensional shape, such as a ring or a doughnut or some other data segment shape.

In some embodiments, the area value for a data segment may be calculated by multiplying the height level of the data segment by a width of the point cloud data within the data segment, depending on the shape of the point cloud data within the data segment. For some data segment shapes (such as a rectangle), an exact width may be used to calculate an area value, while for other data segment shapes (such as a trapezoid) an average width may be used to calculate an area value. For other data segment shapes, an approximate width, or some other dimension, may be used to calculate an area value. Further, the system may use various dimensions to calculate the surface area for three-dimensional data segment shapes (such as rings, doughnuts, or other three-dimensional data segment shapes).

For some embodiments, the height levels of the data segments being compared may be equal. In this case, during the scan, the system may compare the width values of the point cloud data within the compared data segments if the point cloud data has a particular shape, such as a rectangle or a trapezoid. The area values of data segments with equal height levels may be proportional to the width values of the point cloud data within the data segments. Thus, a comparison of the width values may be more computationally efficient for the system than calculating and comparing area values for the data segments. Data segment values other than area values or width values may be calculated and/or compared to determine transitions between data segments.

After the area values of the generated data segments have been calculated, the system may then scan the data segments to identify one or more transitions within the point cloud data. The system may scan the generated data segments, starting with the top data segment (such as a data segment representative of the head) and continuing downwards until the bottom data segment (such as a data segment representative of the legs). During the scan, a value of a selected data segment may be compared with a corresponding value for an adjacent data segment below the selected data segment. In some embodiments, the data segment value for comparison is the area value of the data segment, but other values can be compared. When a transition is identified during the scan, the scan may be paused temporarily, stopped, or continue to identify additional transitions. The system may perform more, fewer, and/or different steps during the scan of generated data segments to identify transitions within the point cloud data.

The system may identify a particular transition based on various criteria. In one embodiment, the system may identify a transition by finding an increase in the area values from a first data segment to a second data segment. Alternatively, the system may identify a transition by finding an increase in the area values that exceeds a threshold from a first data segment to a second data segment. Alternatively, the system may identify a transition by finding the data segment with the maximum area value. In another alternative the system may examine the width values of compared data segments to identify the highest width value when the height levels of the compared data segments are equal. Different criteria are also possible for identifying a transition during a scan.

After completing the scan, the system may have identified one or more transitions within the point cloud data. The identified transition may include two or more data segments. When the particular transition is identified, the data segments of the transition may then be identified as being representative of a particular part of interest of the actor. FIG. 3C displays examples of identifying a first transition 360c, the second transition 365c, and the third transition 370c.

In FIG. 3C, the system may identify the first transition 360c to locate the body 302c of the actor. The first transition may be identified based on a comparison of area values of the data segments. In the displayed embodiment of FIG. 3C, first transition 360c may be identified due to an increase in the area value of the second data segment 320c relative to the first data segment 310c. The amount of the increased area value may exceed a threshold for identifying the first transition.

Once the first transition is identified, the first data segment 310c may be identified as being representative of a portion, or all of, the head 301c of the actor. The second data segment 320c may be identified as being representative of a portion, or all of, the torso or body 302c of the actor. The second data segment 320c may then be used to determine a direction of the body of the actor, and thus, a direction of the actor (such as 212a and 212b from FIGS. 2A and 2B, respectively).

The system may also identify the second transition 365c to locate the arm 303c of the actor. The second transition may also be identified based on a comparison of area values of the data segments. In FIG. 3C, the second transition 365c may be identified due to a decrease in the area value from the second data segment 320c to the third data segment 330c. The amount of the decreased area value may exceed a threshold for identifying the second transition 365c.

Once the transition is identified, the second data segment 320c may be identified as being representative of a portion, or all of, a body 302c of the actor. The third data segment 330c may be identified as being representative of a portion, or all, of the arm 303c of the actor. The third data segment 330c may then be used to determine a direction that the actor is pointing, which then may be considered the direction of the actor (such as 212a and 212b from FIGS. 2A and 2B, respectively).

The system may further identify the third transition 370c to locate the legs 305c of the actor. The third transition may also be identified based on a comparison of area values of the data segments. In FIG. 3C, the third transition 370c may be identified due to a decrease in the area value from the fourth data segment 340c to the fifth data segment 350c. Alternatively, the third transition 370c may be identified due to an increase in the surface area value from the fourth data segment 340c to the fifth data segment 350c (for three-dimensional data segment shapes, such as rings or doughnuts). The amount of the change in the area values between the fourth data segment 340c and the fifth data segment 350c may exceed a threshold for identifying the third transition 370c. Other methods for determining the third transition 370c may also be possible.

Figure 3D:
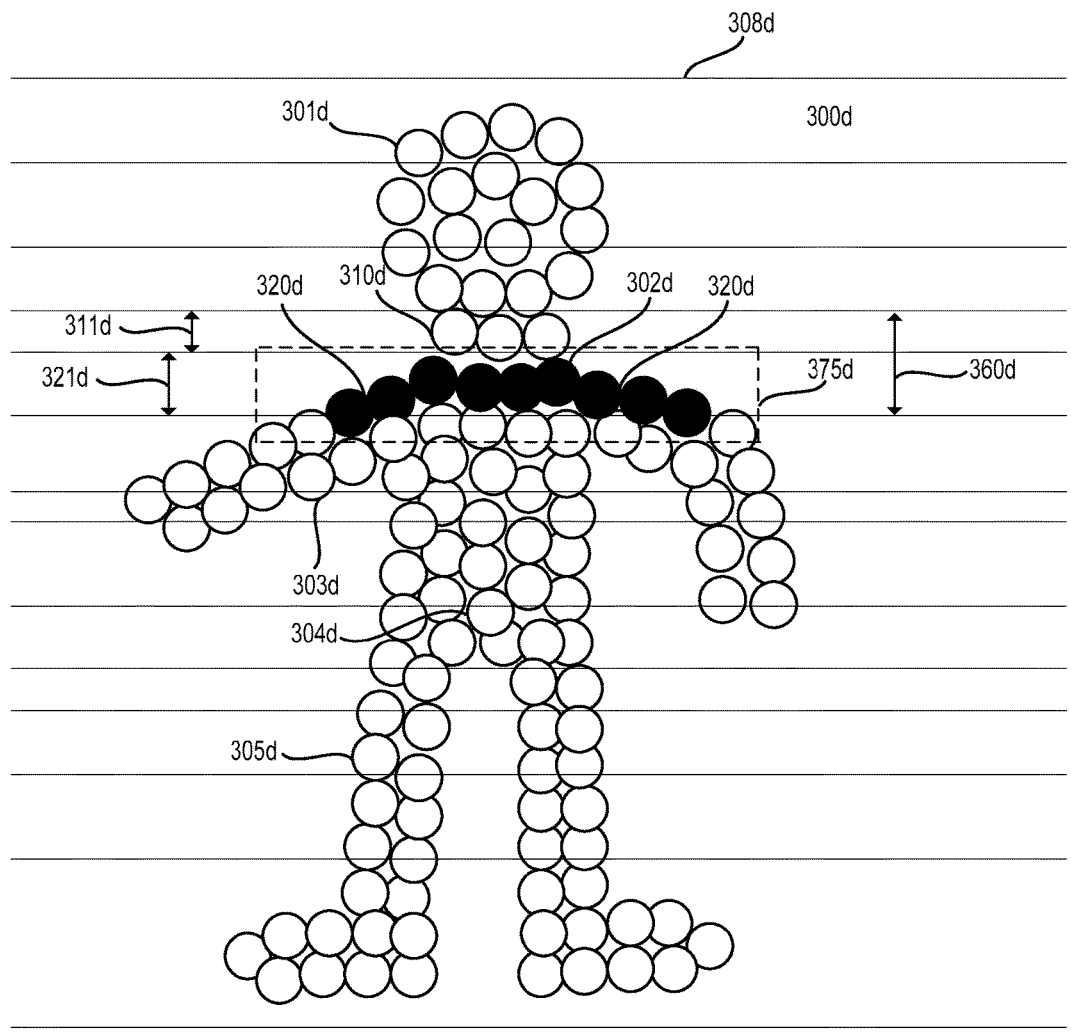

Once the third transition 370c is identified, the fourth data segment 340c may be identified as being representative of a portion, or all, of a bottom of the body 304c of the actor. The fifth data segment 350c may be identified as being representative of a portion of, or all of, the legs 305c of the actor. The fifth data segment 350c may then be used to determine a direction of the legs of the actor, which then may be considered the direction of the actor (such as 212a and 212b from FIGS. 2A and 2B, respectively). FIG. 3D displays an example of how additional information can be determined for an actor based on and identify data segment, such as the second data segment 320c.

FIG. 3D displays a bounding box 375d for a data segment of the point cloud data 300d to determine a direction of the body 302d of the actor. FIG. 3D also displays the first transition 360d, which includes a first data segment 310d and a second data segment 320d. Other embodiments may include more, fewer, or the same amount of bounding boxes around more, fewer, and/or different data segments representative of parts of an actor.

A bounding box 375d may be generated around a data segment to determine the direction of a part of the actor represented by the data segment. The direction of the part of the actor may then be used to infer a direction of the actor. The direction of the actor may correspond to a direction the actor is oriented while stationary or moving. Alternatively, the direction of the part of the actor, as well as the direction of the actor, may correspond to a direction in which the actor is pointing with the part of his body (such as the actor's arm). In other embodiments, a bounding box may be used to determine different information.

In FIG. 3D, bounding box 375d is used to determine the direction of the body 302d of the actor. Once the first transition 360d is identified, the first data segment 310d and the second data segment 320d can also be identified. A bounding box 375d is then generated around data segment 320d. The bounding box 375d is then used to determine the direction of the torso or body 302d of the actor, which is represented by the data segment 320d.

In one embodiment, one or more vectors perpendicular to bounding box 375d are identified as potential directions of the torso or body 302d of the actor. The bounding box 375d may be generated such that the top and bottom line segments of the bounding box are parallel with the shoulders of the torso or body 302d of the actor. The one or more vectors perpendicular to bounding box 375d may correspond to a first vector (not displayed) and a second vector (not displayed) offset 180° from the first vector. The first and second vectors may be perpendicular to bounding box 375d, with the first vector oriented along a direction going into the drawing sheet for FIG. 3D, and a second vector oriented along an opposite direction going out of the drawing sheet for FIG. 3D.

In some embodiments, a determined direction of the torso can be selected from a potential direction (such as the first vector and second vector) based on the point cloud data. For example, if point cloud data 301d indicates facial features (such as a nose), then the second vector can be selected as the determined direction of the torso. However, other embodiments may exist where the front and back of an actor cannot be distinguished based on the point cloud data 300d. In these cases, other data, including historical velocity data and historical orientation data, may be used in combination with the bounding box 375d to determine the direction of the torso the actor. For example, if recent historical velocity data indicates that the actor was moving along a direction corresponding to the first vector, then the first vector may be selected as the determined direction of the torso.

In other embodiments, different vectors relative to a bounding box may be used to determine potential directions of a part of the actor. For example, a bounding box may be generated to surround a portion of an arm of the actor that is pointing in a direction. The bounding box may be generated such that a line segment connecting two corners of the bounding box is parallel with the direction that the arm of the actor is pointing. Thus, vectors parallel with the line segment and the bounding box may be potential directions of the arm of the actor. Of these vectors, the vector oriented along a direction that corresponds to the direction the arm of the actor is pointing may be selected as the determined direction of the arm of the actor.

Figure 4:
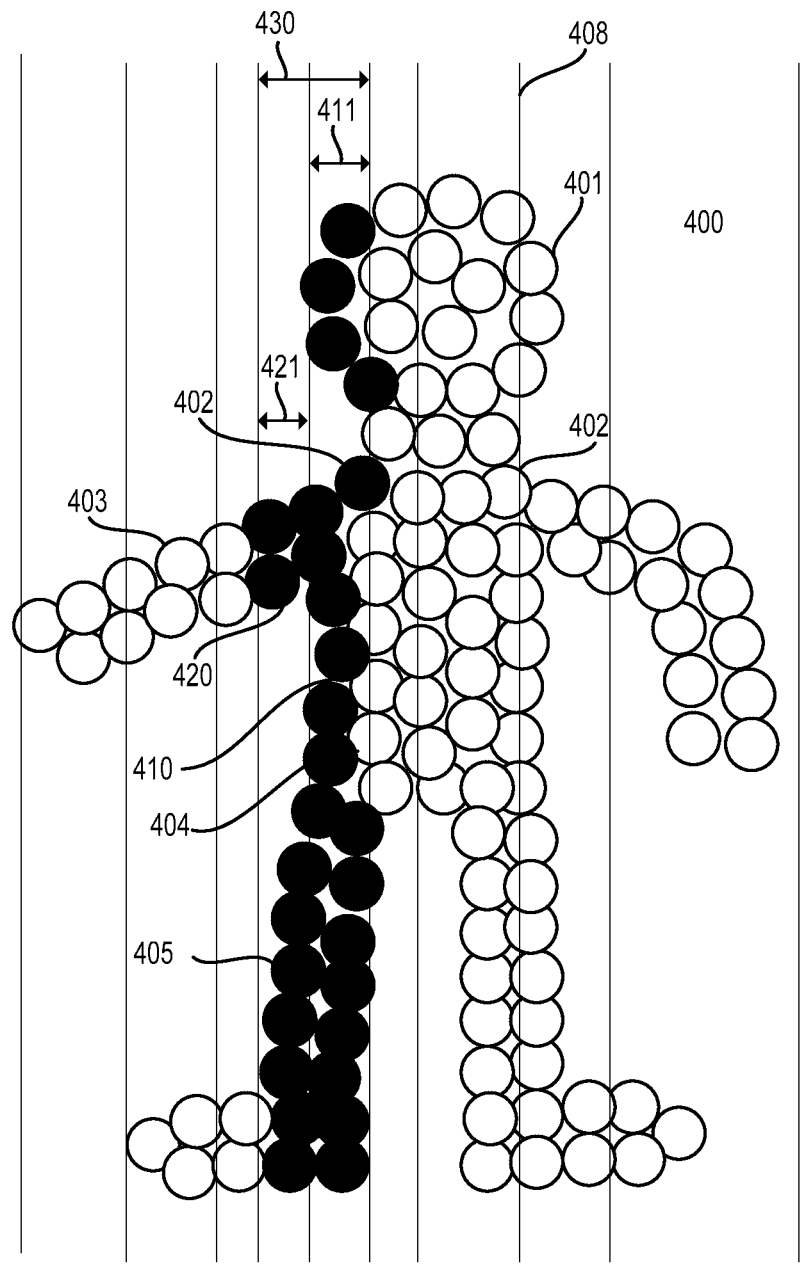
FIG. 4 illustrates another example point cloud representative of an actor, according to an example embodiment.

Although the displayed embodiment of FIG. 3D displays how a bounding box may be used to determine the direction of a part of an actor, a bounding box may be used to determine other information in different ways. For example, historical velocity data and historical orientation data may be used in combination with one or more bounding boxes to determine the direction of one or more parts of an actor. The determined directions of the parts of the actor may then be used to infer a direction that an actor is oriented while stationary or moving, a direction an actor is pointing with a portion of his body (such as his arm), or other information about the actor. While FIGS. 3A-3D show how vertical segmentation of point cloud data can help determine information about an actor, other techniques for analyzing point cloud data are also possible. FIG. 4 presents an example of one technique: horizontal segmentation.

FIG. 4 displays a horizontal segmentation of the point cloud data 400 representative of an actor. The point cloud data includes portions of point cloud data 401-405 representative of parts of the actor, similar to point cloud data 301a-305a from FIG. 3A. FIG. 4 also displays segmentation lines 408, which are generated during horizontal segmentation to generate data segments, including the first data segment 410 and second data segment 420. FIG. 4 also displays a transition 430 between the first data segment 410 and the second data segment 420.

Horizontal segmentation may be a different technique that can be used to analyze point cloud data to determine information about an actor. After receiving point cloud data, one or more segmentation lines may be generated to generate one or more data segments. Area values may then be calculated for the generated data segments. The system may scan the data segments and compare area values of adjacent data segments to identify transition. Once the transition is identified, the data segment of the transition may be selected and identified as being representative of a portion of interest of the actor. Further processing of the selected segment may be done to determine additional information about the actor.

Horizontal segmentation may be executed separately from, or in combination with, vertical segmentation techniques by the system to determine additional information about an actor. Horizontal segmentation may also be used in combination with other techniques to determine additional information about an actor. Horizontal segmentation may be used to generate data segments in two or three dimensions. The shapes may be comparable to the shapes generated by vertical segmentation, as described in FIGS. 3A-3D. Calculation of area values for data segment shapes from horizontal segmentation may be similar to area value calculation for vertical segmentation data segments, as described for FIGS. 3A-3D.

FIG. 4 displays an example of horizontal segmentation for point cloud data 400 to identify the arm 403 of the actor. After receiving point cloud data 400, the system generates segmentation lines 408 to generate a plurality of data segments. The generated data segments include a first data segment 410 and a second data segment 420. Area values of the generated data segments are calculated to find the first transition 430.

After calculating area values for the data segments, the system scans the data segments from right to left. While scanning the data segments, the system compares the calculated area values of the selected data segment with an adjacent data segment to the left of the selected data segment. During the scan, the system may identify a transition 430 between a first data segment 410 and a second data segment 420. The transition may be identified due to a decrease from the area value of the first data segment 410 to the area value of the second data segment 420. The change in area value may exceed a threshold for identifying the transition 430.

Once the transition 430 is identified, the system may identify first data segment 410 as being representative of a portion, or all, of the body 402 of the actor. Further, the system may identify data segment 420 as being representative of a portion, or all, of the arm 403 of the actor. Although FIG. 4 displays horizontal segmentation techniques being used to identify the arm 403 of an actor, horizontal segmentation can be used identify other parts of an actor.

Once a part of an actor is identified using horizontal segmentation techniques, additional information about the part of the actor can be determined based on the identified data segment. For example, a bounding box can be generated around the identified data segment (such as data segment 420) to determine a direction of a part of the actor (such as arm 403). The determined direction may indicate a direction the actor is pointing, a direction the part of the body is oriented while actor is moving or standing still, or some other information. The determined information about the part of the body may also be used to infer a direction of the actor. Other information may also be determined from generating a bounding box around the identified data segment from horizontal segmentation.

Figure 5:
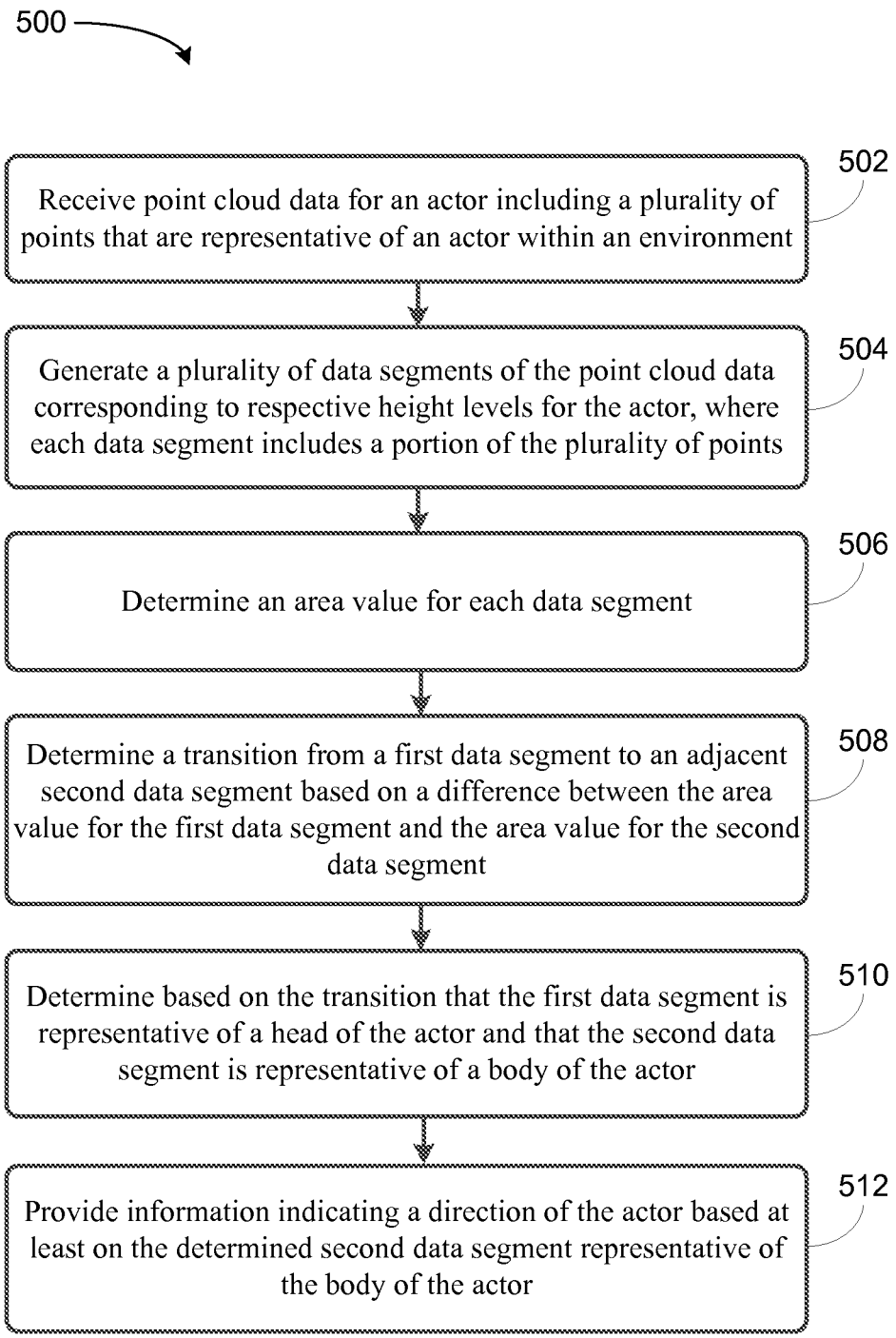
FIG. 5 is a block diagram of an example method, according to an example embodiment.

FIG. 5 illustrates a flowchart showing the method 500 that may allow for determining the direction of an actor based on sensors in an environment, according to an example embodiment. The method 500 may be executed by a control system, such as computing system 104 shown in FIG. 1. Alternatively, the method may be executed by a robotic device, such as the robotic device 230b displayed in FIG. 2B. Other devices or systems may execute method 500 in other embodiments.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or discussed, including substantially concurrent execution of separately described functions, or even in reverse order in some examples, depending on the functionality involved, so long as the overall functionality of the described method is maintained.

As shown by block 502 of FIG. 5, method 500 may involve receiving point cloud data for an actor including a plurality of points representative of an actor within an environment, as shown by block 502 of FIG. 5. In some examples, the point cloud data may be received by LIDAR sensors that may be attached at a fixed location within the environment, located on a mobile robot in the environment, and/or located elsewhere in the environment. In additional examples, the point cloud data may be sparse and have a non-uniform density. In other examples, the point cloud data may include a plurality of points which represent the surface of the detected actor. In some other examples, different types of sensors (such as thermal imaging sensors) may be used to acquire the point cloud data.

Method 500 may further involve generating a plurality of data segments of the point cloud data corresponding to respective height levels for the actor, where each data segment includes a portion of the plurality of points, as displayed by block 504 in FIG. 5. In some examples, vertical segmentation may be used to generate data segments of the point cloud data. In additional examples, vertical segmentation may be done in two dimensions (resulting in rectangular or oval-shaped data segments) or in three dimensions (resulting in ring-shaped or doughnut-shaped data segments). In other examples, a horizontal segmentation may also be used.

Method 500 may also involve determining an area value for each data segment, as can be seen in FIG. 5 by block 506. In some examples, the data segment area value may represent the area or surface area of the plurality of points within the data segment. In additional examples, the data segment area value may equal the surface area of the ring-shaped or doughnut-shaped data segment (such as for three-dimensional data segments). In other examples, the area value may equal the height of the data segment multiplied by the width of the area spanned by the point cloud data within the data segment (such as for two-dimensional, rectangular data segments).

Method 500 may additionally involve determining a transition from a first data segment to an adjacent second data segment based on a difference between the area value for the first data segment and the area value for the second data segment, as shown by block 508 in FIG. 5. In some examples, the area value of the second data segment may be larger than the area value of the first data segment. In additional examples, the area value of the second data segment may be the largest area of all of the data segments.

Method 500 may also include determining based on the transition that the first data segment is representative of a head of the actor and that the second data segment is representative of a body of the actor, as shown by block 510 in FIG. 5. In some examples, the first data segment includes point cloud data for a portion of the head of the actor. In additional examples, the second data segment includes point cloud data for a portion of the body of the actor.

Method 500 may also involve providing information indicating a direction of the actor based at least on the determined second data segment representative of the body of the actor, as can be seen by block 512 in FIG. 5. In some examples, the direction of the actor may be inferred from the direction of the body of the actor. In additional examples, the direction of the body of the actor may be determined by generating a bounding box around the second data segment. In other examples, information indicating the direction of the actor may be provided to a user/operator controlling or assisting a robotic device. In some other examples, the user or operator may adjust the operation of the device based on the provided information indicating the direction of the actor. In some additional examples, the robotic device may be the actor detected within the environment.

Although not displayed in FIG. 5, method 500 may include additional steps, such as adjusting operation of a robot based on the determined direction of the actor. In some examples, the navigation of the robot may be adjusted based on the determined direction of the actor. However, the robot could be adjusted to operate in a different way in response to the determined direction of the actor.

Although not displayed in FIG. 5, the method 500 may also include identifying additional transitions to identify additional parts of the actor. For example, the method may include identifying a second transition to identify third and fourth data segments representative of the bottom of the body of the actor and the legs of the actor, respectively. In additional examples, the direction of the actor may be determined based on any of the four determined data segments alone or in combination. The four data segments may be representative of parts of the actor, including the head, body, bottom of the body, and legs of the actor, respectively.

Various applications and environments using sensors to determine the direction of an actor in the environment are possible for the disclosed systems and methods. For example, some environments where determination of the direction of an actor within the environment may be applicable include manufacturing facilities, mailing or shipping facilities, airports, hospitals, or other environments employing sensors for detecting actors. Furthermore, other applications where determination of the direction of an actor within an environment may be applicable include construction, shipping, manufacturing, healthcare, and/or other applications using environments with sensors. Other applicable environments and applications for the disclosed systems and methods may also be possible.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   receiving, by a control system from at least one depth sensor, point cloud data for an actor including a plurality of points that are representative of the actor within an environment;
   generating, by the control system, a plurality of data segments of the point cloud data corresponding to respective height levels for the actor, wherein each data segment includes a portion of the plurality of points;
   determining, by the control system, an area value for each data segment;
   determining, by the control system, a transition from a first data segment to an adjacent second data segment based on a difference between the area value for the first data segment and the area value for the second data segment;
   determining, by the control system based on the transition, that the first data segment is representative of a head of the actor and that the second data segment is representative of a body of the actor;
   providing, by the control system, information indicating a direction of the actor based at least on the determined second data segment representative of the body of the actor; and
   adjusting operation of a robotic device based on the direction of the actor.

2. The method of claim 1, wherein the area value describes, for each data segment, the area spanned by the corresponding portion of point cloud data.

3. The method of claim 1 further comprising:
   determining a third data segment adjacent to the second data segment that is representative of an arm of the actor; and
   providing information indicating a direction that the actor is pointing based on the determined third data segment that is representative of the arm of the actor.

4. The method of claim 1 further comprising:
   generating a bounding box around the second data segment that is representative of the body of the actor; and
   providing information indicating the direction of the actor based on the bounding box.

5. The method of claim 1 further comprising:
   receiving historical velocity data indicating a previous velocity of the actor;
   receiving historical orientation data indicating a previous direction of the actor; and
   providing information indicating the direction of the actor based on the determined second data segment representative of the body of the actor, the received historical velocity data, and the received historical orientation data.

6. The method of claim 1, wherein the at least one depth sensor comprises at least one LIDAR sensor and wherein the point cloud data has a non-uniform density.

7. The method of claim 1, wherein the height level of the second data segment is the same amount as the height level of the first data segment.

8. A non-transitory computer-readable medium storing instructions that are executable by one or more computing devices, wherein executing the instructions causes the one or more computing devices to perform functions comprising:
   receiving, from at least one depth sensor, point cloud data for an actor including a plurality of points that are representative of the actor within an environment;
   generating a plurality of data segments of the point cloud data corresponding to respective height levels for the actor, wherein each data segment includes a portion of the plurality of points;
   determining an area value for each data segment;
   determining a transition from a first data segment to an adjacent second data segment based on a difference between the area value for the first data segment and the area value for the second data segment;
   determining based on the transition that the first data segment is representative of a head of the actor and that the second data segment is representative of a body of the actor;
   providing information indicating a direction of the actor based at least on the determined second data segment representative of the body of the actor; and
   adjusting operation of a robotic device based on the direction of the actor.

9. The non-transitory computer-readable medium of claim 8, wherein executing the instructions further causes the one or more computing devices to perform functions comprising:
   navigating a robotic device based at least on the direction of the actor.

10. The non-transitory computer-readable medium of claim 8, wherein executing the instructions further causes the one or more computing devices to perform functions comprising:

determining a third data segment adjacent to the second data segment that is representative of an arm of the actor; and providing information indicating a direction that the actor is pointing based on the determined third data segment that is representative of the arm of the actor.

11. The non-transitory computer-readable medium of claim 8, wherein executing the instructions further causes the one or more computing devices to perform functions comprising:

receiving historical velocity data indicating a previous velocity of the actor;

receiving historical orientation data indicating a previous direction of the actor; and providing information indicating the direction of the actor based on the determined second data segment representative of the body of the actor, the received historical velocity data, and the received historical orientation data.

12. The non-transitory computer-readable medium of claim 8, wherein executing the instructions further causes the one or more computing devices to perform functions comprising:

determining a second transition from a third data segment to an adjacent fourth data segment based on a difference between the area value for the third data segment and the area value for the fourth data segment;

determining based on the second transition that the third data segment is representative of a bottom of the body of the actor and that the fourth data segment is representative of the legs of the actor; and providing information indicating the direction of the actor based at least on the determined second data segment representative of the body of the actor and the fourth data segment representative of the legs of the actor.

13. A robotic device comprising:

a processor; and a memory storing instructions that when executed by the processor cause the robotic device to perform functions comprising:

receiving point cloud data for an actor including a plurality of points that are representative of the actor within an environment;

generating a plurality of data segments of the point cloud data corresponding to respective height levels for the actor, wherein each data segment includes a portion of the plurality of points;

determining an area value for each data segment;

determining a transition from a first data segment to an adjacent second data segment based on a difference between the area value for the first data segment and the area value for the second data segment;

determining based on the transition that the first data segment is representative of a head of the actor and that the second data segment is representative of a body of the actor;

determining a direction of the actor based at least on the determined second data segment representative of the body of the actor; and adjusting operation of the robotic device based on the direction of the actor.

14. The robotic device of claim 13, wherein the point cloud data is received from one or more LIDAR sensors.

15. The robotic device of claim 13, wherein the instructions further cause the robotic device to perform functions comprising:

determining a third data segment adjacent to the second data segment that is representative of an arm of the actor;

determining a direction that the actor is pointing based on the determined third data segment that is representative of the arm of the actor; and adjusting operation of the robotic device based on the direction the actor is pointing.

16. The robotic device of claim 13, wherein the instructions further cause the robotic device to perform functions comprising:

generating a bounding box around the second data segment that is representative of the body of the actor; and determining the direction of the actor based on the bounding box.

17. The robotic device of claim 13, wherein the instructions further cause the robotic device to perform functions comprising:

receiving historical velocity data indicating a previous velocity of the actor;

receiving historical orientation data indicating a previous direction of the actor; and determining the direction of the actor based on the determined second data segment representative of the body of the actor, the received historical velocity data, and the received historical orientation data.

18. The robotic device of claim 13, wherein the area value describes, for each data segment, the surface area spanned by the corresponding portion of point cloud data.

* * * * *